(12) United States Patent (10) Patent No.: US 8,612,100 B2
Goy (45) Date of Patent: Dec. 17, 2013

(54) VEHICLE MANAGEMENT AND CONTROL SYSTEM

(76) Inventor: Min Tat Goy, Homebush (AU)

( * ) Notice: Subject to any disclaimer, the term of this patent is extended or adjusted under 35 U.S.C. 154(b) by 0 days.

(21) Appl. No.: 13/366,361

(22) Filed: Feb. 6, 2012

(65) Prior Publication Data

US 2012/0215407 A1 Aug. 23, 2012

Related U.S. Application Data

(60) Provisional application No. 61/444,700, filed on Feb. 19, 2011.

(51) Int. Cl.
*G06F 13/00* (2006.01)
(52) U.S. Cl.
USPC .............................................. 701/48; 701/59
(58) Field of Classification Search
USPC ...................................... 701/48, 59
See application file for complete search history.

(56) References Cited

U.S. PATENT DOCUMENTS

| 7,124,027 B1* | 10/2006 | Ernst et al. ..................... 701/301 |
| 2007/0028220 A1* | 2/2007 | Miller et al. .................. 717/124 |
| 2009/0083522 A1* | 3/2009 | Boggs et al. .................. 712/220 |

* cited by examiner

*Primary Examiner* — Mary Cheung
*Assistant Examiner* — Yuen Wong

(57) ABSTRACT

In accordance with one embodiment a vehicle management and control system can comprise a main computer (200) that can be operatively connected to a plurality of vehicle systems and subsystems, a main operating system (202), a memory (which can be part of the computer), and a memory controller in the form of a master control framework (204). The vehicle management and control system controls the operation of the vehicle by managing all communication between vehicle systems and subsystems, making major decisions on behalf of, and issuing commands to relevant vehicle systems and subsystems based on the import and feedback information it receives from those systems and subsystems. Consequently, the burden of major decision making and inter-system communication is taken off each individual system and subsystem. This allows the construction of each vehicle system and subsystem to be greatly simplified, resulting in an overall reduction of vehicle complexity.

1 Claim, 15 Drawing Sheets

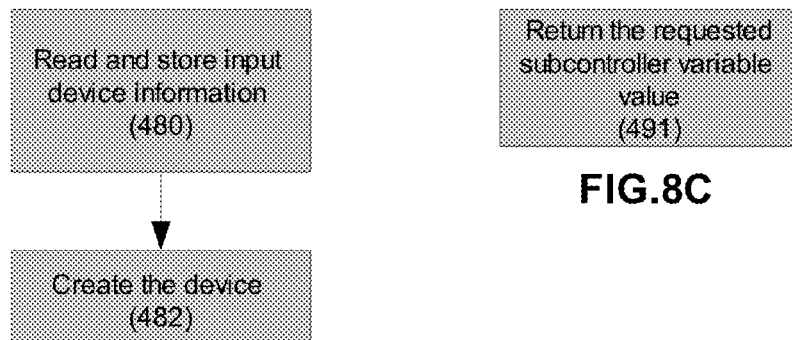
FIG.8C
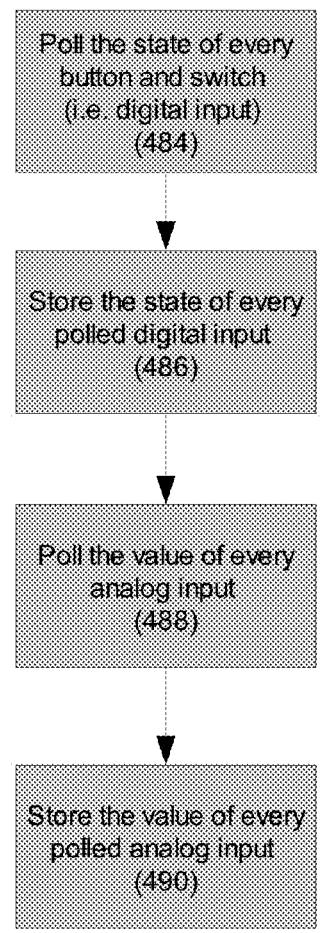
FIG.8A
FIG.8B

VEHICLE MANAGEMENT AND CONTROL SYSTEM

CROSS-REFERENCE TO RELATED APPLICATIONS

This application claims the benefit of provisional patent application No. 61/444,700, filed 2011 Feb. 19 by the present inventor.

BACKGROUND

Embedded systems are responsible for the control and functions of many modern road vehicle's systems or subsystems. An embedded system in the automotive context is also known by other names such as ECU (Electronic Control Unit), ECM (Electronic Control Module) and CCM (Central Control Module).

The development of automotive embedded systems mainly evolved in isolation of the general computer industry. Most embedded system developers are domain specific (i.e. their programming language knowledge and skills are confined to a specific field such as automotive) and often narrowed down to specific platforms and processors. They are also usually engineers trained in traditional areas such as automotive, electrical/electronics and telecommunications (as opposed to programmers and software engineers). Like the rest of the auto industry, the growth of vehicle embedded technology is very much organic and gradual relative to the fast and often disruptive growth of the general computer industry. Since automotive embedded system development is very much independent of the general computer industry, automotive embedded system developers usually do not have to keep up with the rapid changing technology of the general computer industry.

The State of Road Vehicle Embedded Systems

Prior to the 1980s, road vehicles consisted of mainly mechanical systems. By 2010, it was estimated that electronic systems account for approximately 40% of a vehicle's cost.

The integration of embedded systems into road vehicles is an uptrend; in order to incorporate more functionalities, vehicle manufacturers have been integrating more and more embedded systems into their products. These embedded systems are commonly driven by a combination of networked microcontrollers, programmable logic controllers (PLCs) as well as real-time operating system (RTOS) based microprocessors.

These embedded systems can be found in various segments of operation such as powertrain, safety, vehicle controls, driver assistance, comfort and convenience as well as infotainment and communications.

The embedded systems used in road vehicles also employ various communications protocols such as Controller Area Network (CAN), FlexRay, Local Interconnect Network (LIN), Vehicle Area Network (VAN), Media Oriented Systems Transport (MOST), Time-Triggered Protocol (TTP), SAE J1850, J1708, J1587 and J1939 to name a few. The level of adoption of these protocols depends on individual vehicle manufacturers.

AUTOSAR (AUTomotive Open System Architecture), a development partnership formed by major vehicle manufactures, suppliers and tool developers have tried to reign in the non-uniformity in the area of automotive embedded systems by coming up with a standard architecture whereby future vehicle applications would be based. However, the criticism was that some influential players within the partnership have managed to lobby for certain elements (e.g. existing standards used by them) to be included as part of the new standard contrary to the interests of other AUTOSAR members. This has created what critics claimed as a "bloated standard", meaning a standard with "too many standards and definitions", resulting in more complexity and fragmentation under a new name.

The Results of Integrating More Embedded Systems Into Vehicles

Many vehicle manufacturers today are essentially system integrators. Although certain systems and subsystems are still developed and built in-house, it is not uncommon for vehicle manufacturers to also source entire systems and subsystems from external suppliers in order to reduce development time.

In many cases, these systems and subsystems are also supplied with their own embedded systems, software and sometimes even their own RTOSes. As a result, there are more processors, cabling, embedded software and protocols to integrate and reconcile. The result is an exponential increase in complexity that vehicle manufacturers and suppliers are finding increasingly difficult to manage.

Adding to the problem is the inherent complexity of these embedded systems. Integration and testing are complicated because a lot of these embedded systems operate on the basis of hardware event triggering, and so could produce unexpected interrupts, interference and conflict in resource sharing when interacting with other embedded systems.

Debugging embedded system related problems can be tedious and sometimes impossible within the relatively short period of time allocated for vehicle testing. (In the past, it is not uncommon for vehicle development to take five years. Today, many vehicle manufacturers roll out a new model within two to three years). Hardware interrupts in automotive context can be very hard to trace due to the multiplicity of embedded systems and their often complicated interactions with each other. Moreover, the condition that produced certain trigger events can be extremely difficult or impossible to replicate in laboratory conditions. It does not help too that many suppliers do not permit vehicle manufacturers to access the source code of their software. Without viewing the source code, the task of debugging is made a lot harder.

If software bugs were found after the vehicles have entered into production, then a recall may be the only option. The same goes if any embedded system needs to be updated with additional safety functions post vehicle delivery to customers.

Compatibility issues are also becoming increasingly common as more and more vehicle manufacturers attempt to support connectivity for third party devices (e.g. tablets and smart phones) in their vehicles for infotainment and communication. As discussed earlier, automotive embedded systems have evolved mainly in isolation of the general computer industry. On the other hand, these mobile devices (which are part of the general computer industry) run operating systems and software that are updated in as often as monthly or even more regularly. Consequently many such vehicles are beginning to experience software conflict between its own system and the third party systems when they are put together. In other words, vehicle manufacturers are struggling to keep up with change.

As for suppliers, to satisfy the requirements of vehicle manufacturers is no easy task either. Often times different vehicle manufacturers have different preferred development platform as well as protocol sets of their own. Hence suppliers must ensure that their products are compatible with the platform of all the manufacturers they supply. It is also often necessary for suppliers to be staffed with specialised manpower knowledgeable in different development platforms and processors, for both new and legacy products that they are required to support. These specialists can be difficult to source, and if available, often command high wages, further driving up the cost for suppliers.

Over the years, the job as well as training of service technicians have also become increasingly more complicated and specialised. Due to the myriads and multitudes of embedded systems used in vehicles, many service technicians have to specialise in a group of similarly built vehicles. With certain manufactures, some of these technicians have to even specialise in a single brand. Such specialisation have resulted in technicians being able to service a limited make of vehicles, hence reducing their market opportunity and customer base.

If the current trend (of integrating more embedded systems into vehicles) continues, we can be assured that vehicle manufactures and suppliers will have to wrestle with increasing complexity, cost, greater liability due to potential safety issues and longer time-to-market. Service technicians will have to be contented with narrower customer base or encounter "black boxes" they have neither seen before nor know how to service.

Very soon, end users will experience and increase in system conflicts, especially when using their mobile devices in conjunction with their vehicles (with some being potentially dangerous) as well as higher maintenance cost of their vehicles.

SUMMARY

In accordance with one embodiment a vehicle management and control system can Comprise a main computer that can be operatively connected to a plurality of vehicle systems and subsystems, a main operating system, a memory (which can be part of the computer), and a memory controller in the form of a master control framework. The vehicle management and control system controls the operation of the vehicle by managing all communication between vehicle systems and subsystems, making major decisions on behalf of, and issuing commands to relevant vehicle systems and subsystems based on the input and feedback information it receives from those systems and subsystems.

Advantages

Accordingly several advantages of one or more aspects are as follows: to provide a centralized system capable of managing and controlling an entire vehicle through its systems and subsystems, from a single main computer and from a single main operating system, that is capable of taking over all or majority of logic processing from embedded systems in that vehicle, that frees individual vehicle systems/subsystems from needing to have their own complex embedded systems, that reduces the number of embedded systems on a vehicle and therefore reducing vehicle development and maintenance complexity (which translates to cost and time savings), that increases the compatibility of components between the general computer industry and the auto industry, that allows the same vehicle management and control system to be used across a range of vehicle models with little modifications. Other advantages of one or more aspects will be apparent from a consideration of the drawings and ensuing description.

DRAWINGS

Figures

In the drawings, closely related figures have the same number but different alphabetic suffixes.

FIG. 8A shows a flowchart of a subcontroller class's init( ) method in accordance with one embodiment.

FIG. 8B shows a flowchart of a subcontroller class's update( ) method in accordance with one embodiment.

FIG. 8C shows a flowchart of a getter method of a subcontroller class in accordance with one embodiment. Such a getter method is required by the Main Controller class.

DRAWINGS

Reference Numerals

Figure 1:
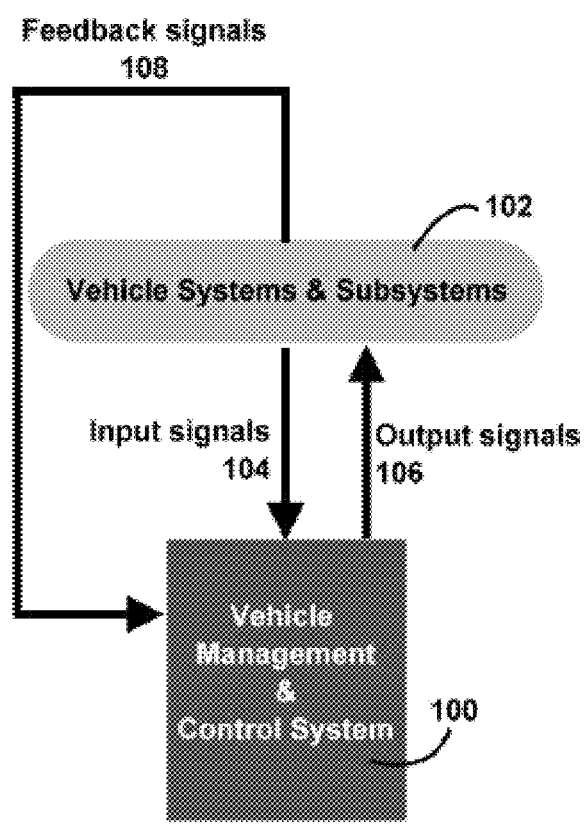
FIG. 1 shows the interaction between a vehicle's systems and subsystems with the vehicle management and control system in accordance with one embodiment.

All reference numerals are listed below except the reference numerals used in flowcharts (reference numerals in the flowcharts are not listed below because each referenced stage in the flowcharts already provides sufficient description).
100 Vehicle Management and Control System
102 Vehicle Systems and Subsystems
104 Input Signals
106 Output Signals
108 Feedback Signals
200 Main Computer
202 Operating System
204 Master Control Framework
206 Optional Input/Output Ports Expansion Module(s)
208 Optional Auxiliary Module(s)
300 Main Application Class
302 Main Controller Class
304 Main Model Class
306 Main View Class
308 Subcontroller Classes
310 Submodel Classes
312 Subview Classes
314 Input Information (maybe in the same format or in another format decoded from input signals 104)
316 Feedback Information (may be in the same format or in another format decoded from feedback signals 108)
318 Output Information (may be in the same format or in another format decoded from output signals 106)
320 Digital Instrument Cluster (aesthetically skinnable)
322 Library Classes
324 Services Classes
326 Data Files
327 Asset Files

DETAILED DESCRIPTION

First Embodiment

Figure 2:
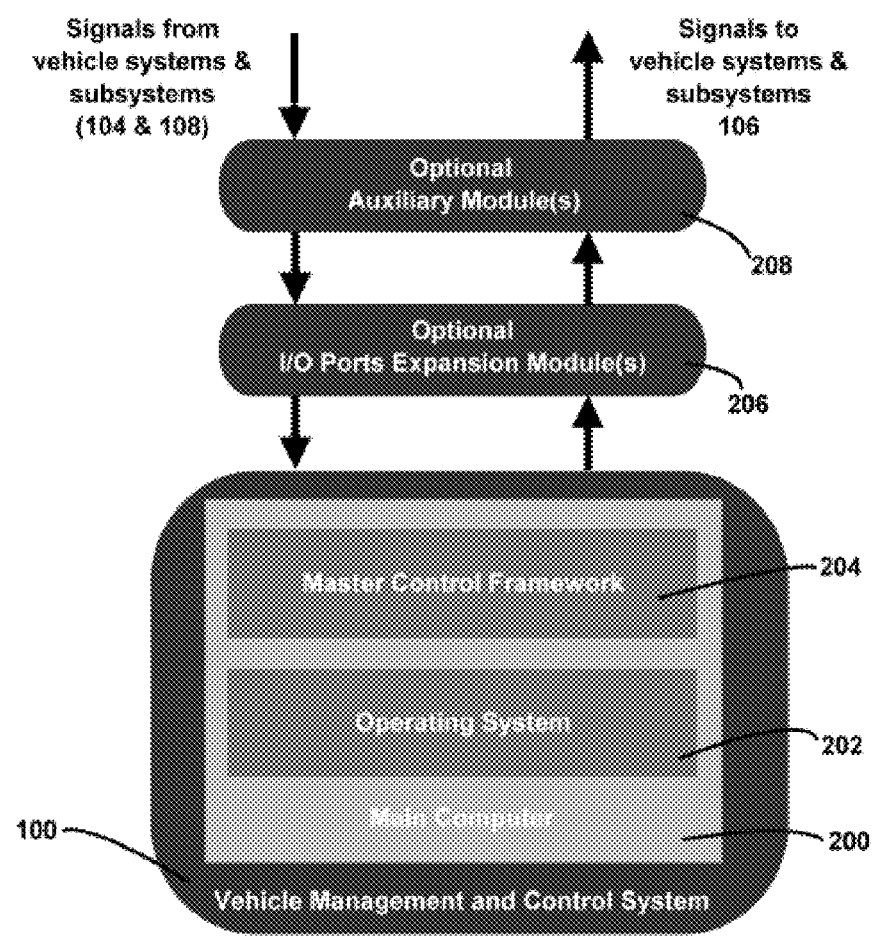
FIG. 2 shows a composition of the components in the vehicle management and control system and its interaction with optional components in accordance with one embodiment.

FIG. 2 shows one embodiment of the vehicle management and control system which comprises a main computer 200 and installed with a main operating system 202. Additionally, the master control framework 204 is also installed on the main computer 200. Optional input/output (I/O) ports expansion module(s) 206 may also be connected to the main computer 200 if more I/O interfaces are required.

The Main Computer 200

The preferred minimum performance specifications of the main computer 200 are as follow:
  Processor—3.4 GHz clock speed, 64-bit instruction set, 8 Mb cache or faster
  Memory—16GB DDR3-1066/1333 or more
  Data Storage Device—Solid State Drive (SSD) or faster, with capacity of 1 TB or more
  I/O (Input/Output) Standard—USB 3.0 or other communications protocols that are compatible with the general computer industry.

Although lower specifications may be possible, the highest performance and latest (i.e. most advanced) available specifications should be chosen for the main computer 200.

In terms of physical durability, the main computer 200 is preferably certified to:
  MIL-STD-810G (for use in adverse conditions that include drops, shocks, vibration, humidity, altitude, extreme temperatures, thermal shock as well as resistance against elements such as rain, dust and sand)
  IP65 (protection against dust and water ingress)
Where available, a better and latest equivalent standards to the aforementioned standards should be used.

The Operating System 202

The installed operating system 202 can be, but not limited, to one of the following:
  Microsoft Windows 7® or later
  Mac OS X® or later
  Linux (kernel 3.2.4 or later)—any stable distribution
Where available, a latest and most stable operating system and version should be chosen for the operating system 202. Moreover, the operating system 202 can also be a mobile operating system (e.g. Apple iOS or Google Android) as long as the resultant performance is satisfactory and it is compatible with the main computer 200 and the master control framework 204.

Moreover it is highly recommended that the operating system 202 be installed on one partition of the data storage device and the master control framework 204 be installed on another partition.

The Master Control Framework 204

The master control framework 204 may be implemented in any programming language. In this particular embodiment, the master control framework 204 is implemented in Java, a cross-platform, object-oriented programming language.

Figure 3:
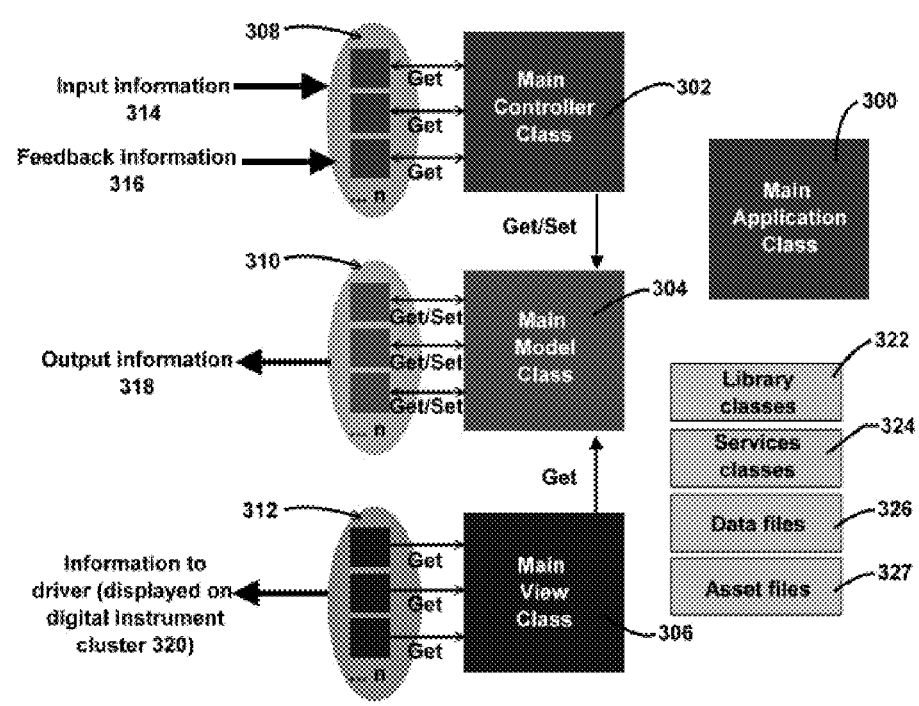
FIG. 3 shows a composition of the classes and some of their relationships with each other within the master control framework in accordance with one embodiment.
Figure 4:
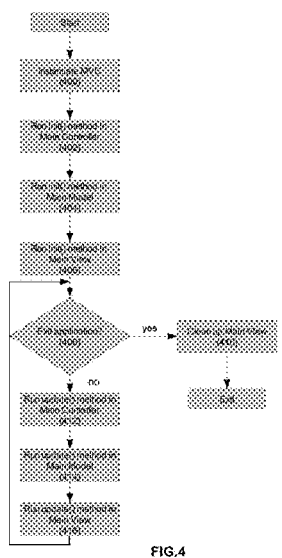
FIG. 4 shows a flowchart of the Main Application class in accordance with one embodiment.
Figure 5A:
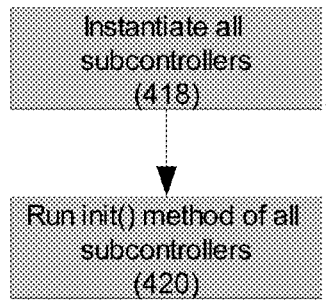
FIG. 5A shows a flowchart of the Main Controller class's init( ) method in accordance with one embodiment.
Figure 5B:
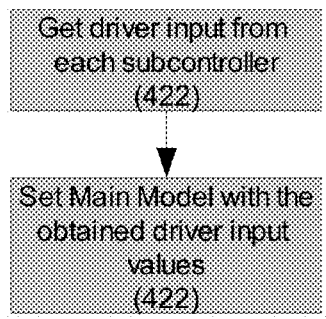
FIG. 5B shows a flowchart of the Main Controller class's update( ) method in accordance with one embodiment.
Figure 5C:
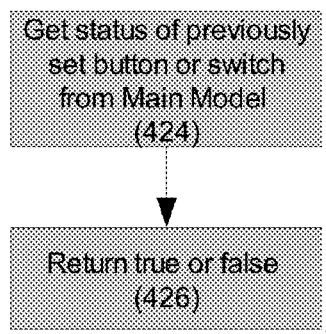
FIG. 5C shows a flowchart of a generic get( ) method of the Main Controller class in accordance with one embodiment.
Figure 6A:
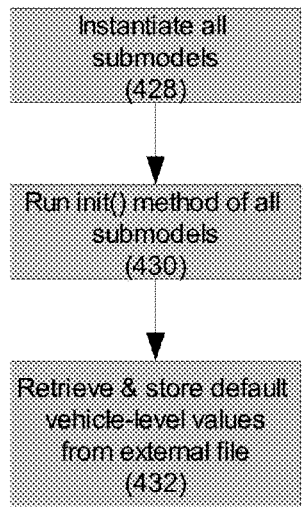
FIG. 6A shows a flowchart of the Main Model class's init( ) method in accordance with one embodiment.
Figure 6B:
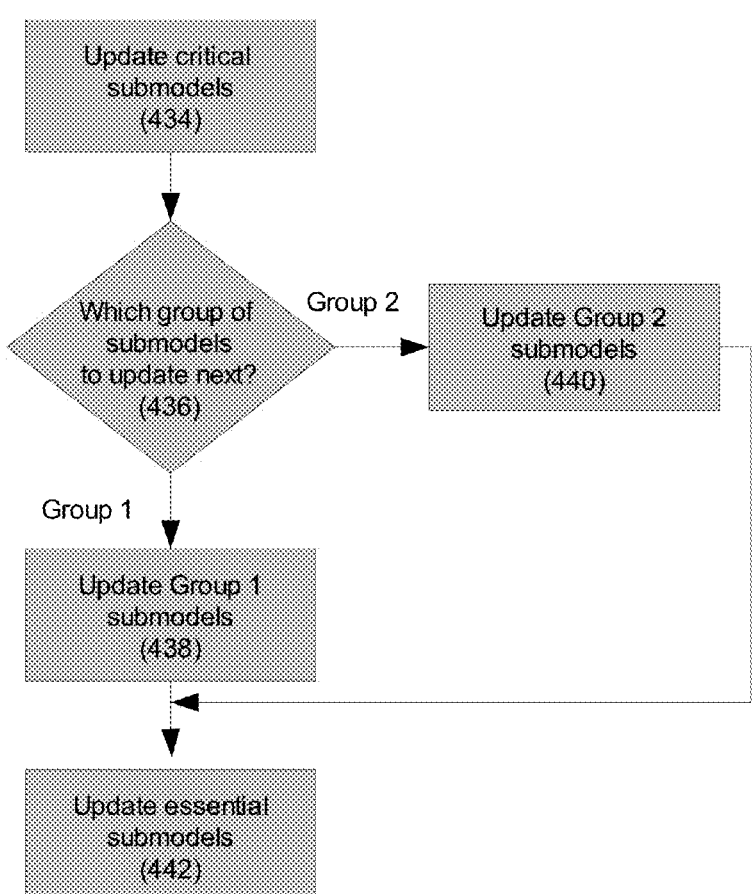
FIG. 6B shows a flowchart of the Main Model class's update( ) method in accordance with one embodiment.
Figure 6C:
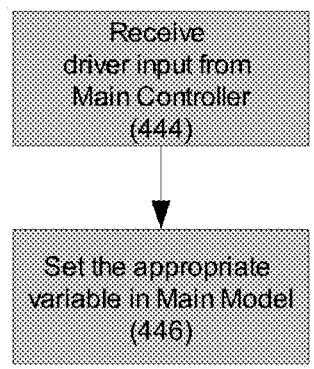
FIG. 6C shows a flowchart of a setter method of the Main Model class in accordance with one embodiment. Such a setter method is required by the Main Controller class.
Figure 6D:
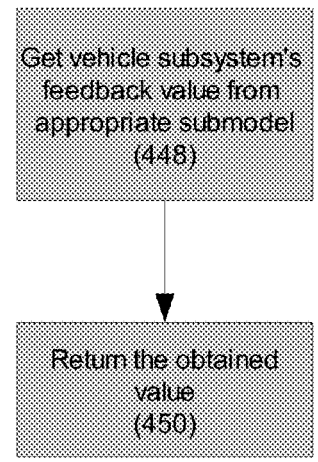
FIG. 6D shows a flowchart of a getter method of the Main Model class in accordance with one embodiment. Such a getter method is required by the Main View class.
Figure 6E:
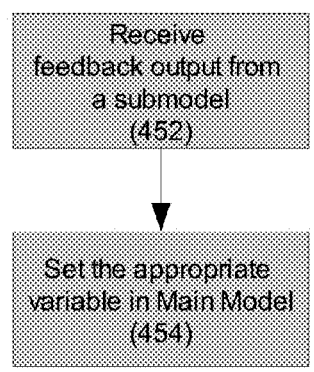
FIG. 6E shows a flowchart of a setter method of the Main Model class in accordance with one embodiment. Such a setter method is required by the submodel classes.
Figure 6F:
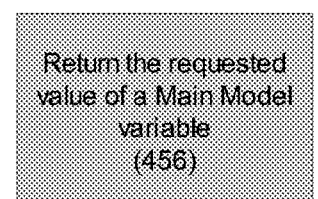
FIG. 6F shows a flowchart of a getter method of the Main Model class in accordance with one embodiment. Such a getter method is required by the submodel classes.

The framework 204 is also implemented based on a modified Model-View-Controller (MVC) design pattern customised to suit the requirements of the vehicle management and control system. FIG. 3 shows the classes within the framework 204:
  Main Application class 300—The Main Application class 300 contains the program's starting point (i.e. execution point). This is where the main MVC classes are declared and instantiated. The flowchart in FIG. 4 shows how the Main Application class 300 can be constructed.
  Main Controller class 302—The Main Controller class 302, together with its subcontroller classes 308, are collectively responsible for obtaining input information 314 from vehicle systems and subsystems that are connected to the vehicle management and control system 100. They (302 and 308) are also responsible for obtaining feedback information 316 from individual vehicle systems and subsystems in order to determine if a certain function within a vehicle system/subsystem (e.g. a turn signal) has been successfully set or otherwise. The Main Controller then provides both input information 314 and feedback information 316 to the Main Model 304 through its setter methods. Moreover, the Main Controller class 302 decides the order in which subcontroller classes 308 are updated. The flowcharts in FIGS. 5A-5C show how the Main Controller class 302 can be constructed.
  Subcontroller classes 302—Each subcontroller class can be seen as an extension of the Main Controller class 302. Each subcontroller class is dedicated to obtaining input information 314 or feedback information 316 from a specific vehicle input system/subsystem (e.g. steering wheel) through polling. Since each vehicle input system/ subsystem may be different, each subcontroller class may also be customised by a vehicle manufacturer or supplier. The flowcharts in FIGS. 8A-8C show how a subcontroller class can be constructed.

Main Model class 304—The Main Model class 304, together with its submodel classes 310, are collectively responsible for taking input information from the Main Controller class 302 and subcontroller classes 308 for logic processing. Moreover, the Main Model class 304 decides the order in which submodel classes 310 are updated. The flowcharts in FIGS. 6A-6F show how the Main Model class 304 can be constructed.

Submodel classes 310—Each vehicle system/subsystem has its own dedicated submodel class, which contains the decision-making logic for that particular vehicle system/subsystem (e.g. cruise control system). Consequently, each submodel class's algorithm can be customised by a vehicle manufacturer or supplier to cater specifically for the needs of that particular vehicle system/subsystem. Submodel classes take the input information 314 they receive, process the information, then send set the result as output information 318 so that their respective vehicle system/subsystems can retrieve said output information for action. All information stored by submodel classes 310 are accessible to the Main Model class 304 as well. The flowcharts in FIGS. 9A-9D show how a submodel class can be constructed.

Figure 7A:
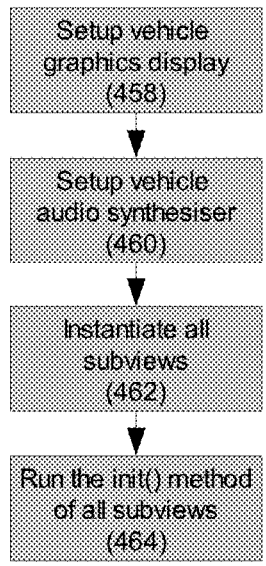
FIG. 7A shows a flowchart of the Main View class's init( ) method in accordance with one embodiment.
Figure 7B:
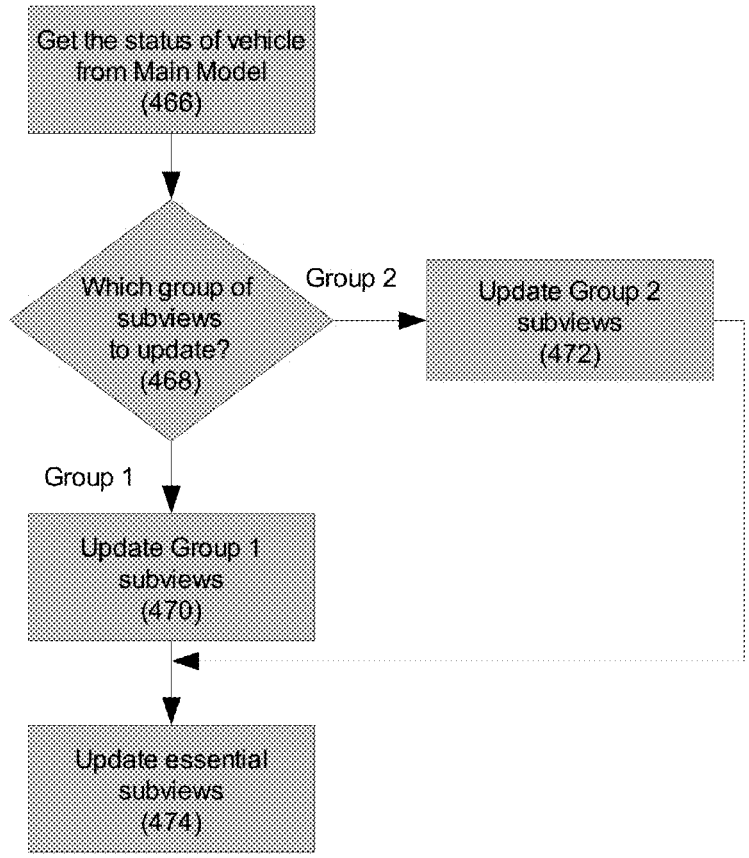
FIG. 7B shows a flowchart of the Main View class's update( ) method in accordance with one embodiment.
Figure 7C:
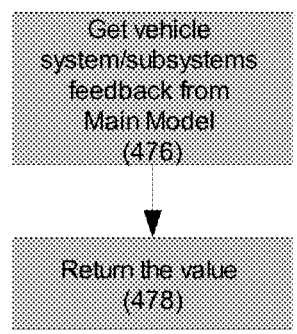
FIG. 7C shows a flowchart of a getter method of the Main View class in accordance with one embodiment. Such a getter method is required by the subview classes.
Figure 9A:
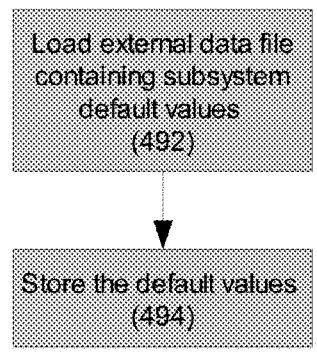
FIG. 9A shows a flowchart of a submodel class's init( ) method in accordance with one embodiment.
Figure 9B:
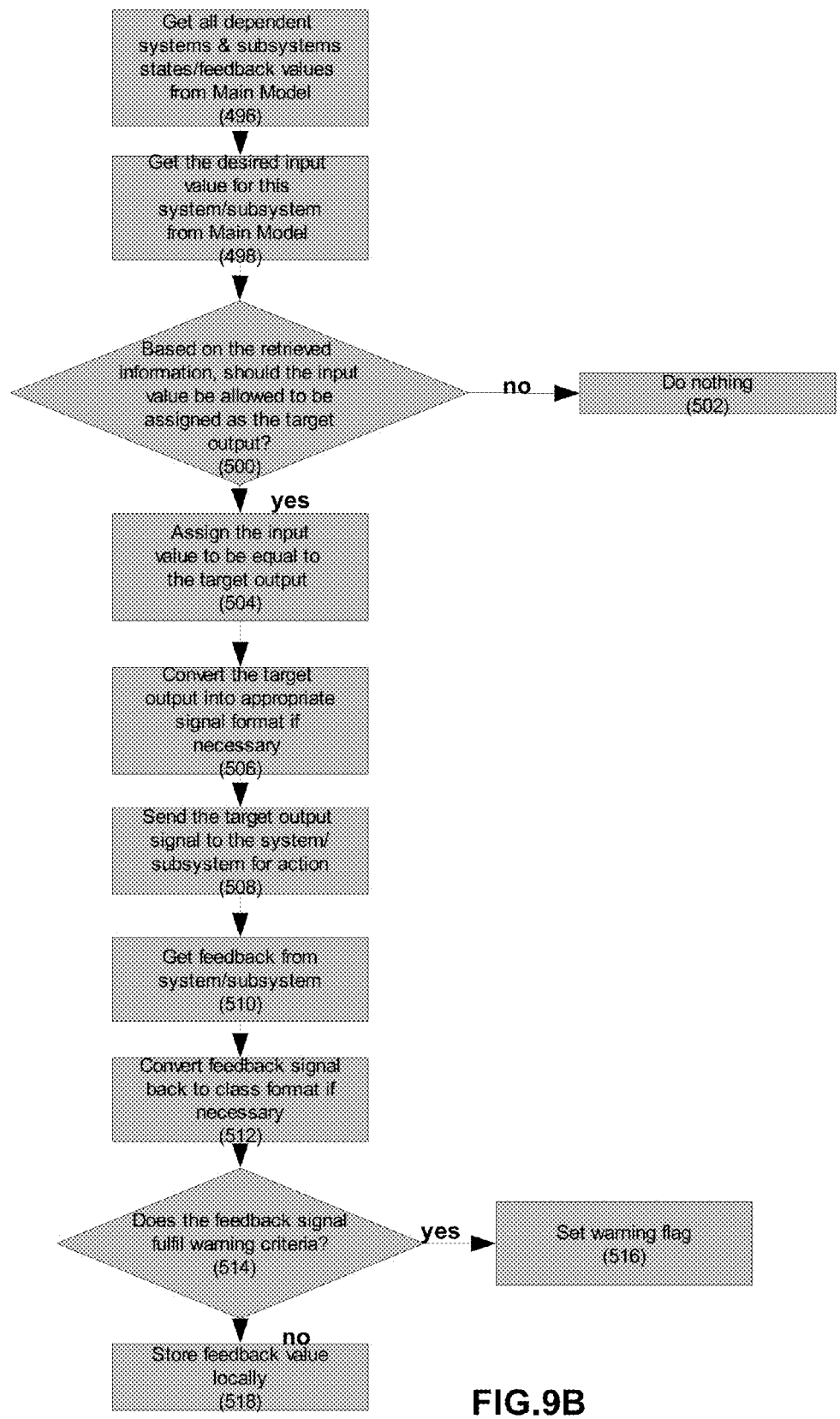
FIG. 9B shows a flowchart of a submodel class's update( ) method in accordance with one embodiment.
Figure 9C:
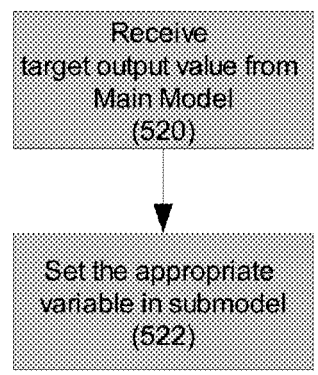
FIG. 9C shows a flowchart of a setter method of a submodel class in accordance with one embodiment. Such a setter method is required by the Main Model class.
Figure 9D:
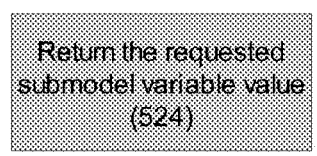
FIG. 9D shows a flowchart of a getter method of a submodel class in accordance with one embodiment. Such a getter method is required by the Main Model class.

Main View class 306—The Main View class 306, together with its subview classes 312, are responsible for obtaining feedback information 316 from the Main Model class. This information 316 is then graphically (or textually) displayed to the driver on a digital instrument cluster 320. The Main View class 306 sets up the graphics and audio (in this embodiment, OpenGL and OpenAL were used) for the digital instrument cluster 320. The Main View class 306 is also responsible for the graphical arrangement as well as the order of update of each gauge, dial, indicator, and text (represented by subview classes 312) displayed on the screen of the digital instrument cluster 320. The flowcharts in FIGS. 7A-7C show how the Main View class 306 can be constructed.

Figure 10A:
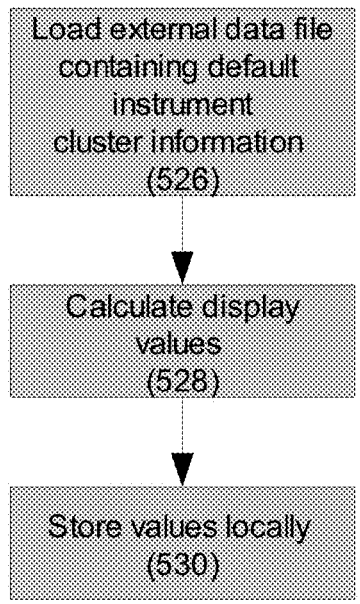
FIG. 10A shows a flowchart of a subview class's init( ) method in accordance with one embodiment.
Figure 10B:
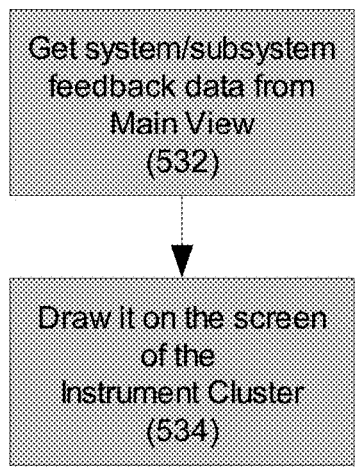
FIG. 10B shows a flowchart of a subview class's update( ) method in accordance with one embodiment.
Figure 11:
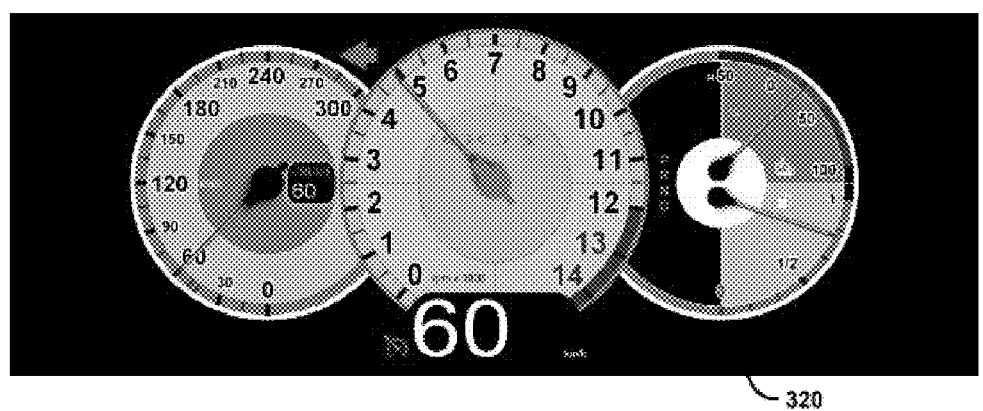
FIG. 11 shows a digital instrument cluster design in accordance with one embodiment. This digital instrument cluster can be displayed on a screen (typically the size of 1280 pixels by 480 pixels) mounted in a vehicle's dashboard.

Subview classes 312—Each subview class generally represents a specific feedback information (e.g. motor RPM) from a vehicle system/subsystem. Subview classes take the feedback information 316 they receive, then graphically or textually display that information 316 on the digital instrument cluster 320. The flowcharts in FIGS. 10A and 10B show how a subview class can be constructed.

Library classes 322—In this embodiment, the library classes consist of standard Java library classes and LWJGL classes (obtainable from www.lwjgl.org and required to display the graphics and play audio within the master control framework 204).

Services classes 324—In this embodiment, services classes 324 consist of custom but common support classes (e.g. classes written to load an XML file). Vehicle manufactures and suppliers can add more classes if necessary to support the integration of their vehicle systems and subsystems with the master control framework 204.

Data files 326—In this embodiment, data files 326 consist of the following XML files:
Vehicle Data file—Contains default/initialization properties of a vehicle model (e.g. kerb weight, maximum allowable top speed, etc.)
Component Data file—Contains default/initialisation properties for every important vehicle system/subsystem (e.g. maximum RPM speed of propulsion motor, maximum discharge current of propulsion battery, etc.)
Instrument Cluster Data file—Contains default/initialisation properties required for graphical display of each gauge, indicator and text used in the digital instrument cluster 320 (e.g. number of divisions on the speedometer)
Sprite Data file—Contains properties and path references to the images (i.e. sprites) used mainly by the digital instrument cluster 320.
Sound Player Data file—Contains default/initialisation properties required for all subview classes 312 that require audio playback (e.g. which sound clip to play for warning sound when motor RPM is redlining)
Sound Data file—Contain properties and path references to all the audio clips used within the master control framework 204.

Asset files 327—In this embodiment, asset files 327 refer to all the images and audio clips used within the master control framework 204

Operation—FIGS. 1-3

Using human physiology as an analogy, the vehicle management and control system 100 can be thought of as the "nervous system" equivalent of a vehicle. This system 100 coordinates (i.e. manages and controls) the actions of the other vehicle systems and subsystems 102. In the case of an electric car, these systems/subsystems 102 may include, but not limited to:
Lighting and Signalling
Braking Systems
Visibility
Cab Environment and Comfort
Maintenance and Load Functions
Propulsion Motor
Propulsion Battery
Transmission
Power Drive
Vehicle Handling & Cruise Control
Active & Passive Safety Systems
Security
General Electric Functions
Information & Communication
Entertainment
Drive Sound Synthesiser The vehicle management and control system 100 is also responsible for the transmittal of signals (104, 106 and 108) between different systems and subsystems of the vehicle.

In this particular embodiment, individual vehicle system/subsystem may be connected to the vehicle management and control system 100 using Universal Serial Bus (USB) communication protocol. The physical cables and connectors used to link the vehicle management and control system 100 with other vehicle systems and subsystems 102 are of those normally approved (in terms of durability standards) for automotive application.

In a case where a vehicle system/subsystem is unable to employ USB as its communication protocol, an additional auxiliary module 208 (e.g. an USB-RS232 adaptor) may be used to facilitate communication between that vehicle system/subsystem with the vehicle management and control system 100.

Moreover, if the vehicle management and control system 100's main computer 200 has insufficient I/O ports, additional I/O ports expansion modules 206 can be used to provide extra interfaces to accommodate the connection with vehicle systems and subsystems 102.

Signals Connections

Input signals 104 connection—Signals generated by a human-machine-interface (HMI) devices (e.g. steering wheel, throttle pedal, brake pedal, turn signal indicator stalk, etc.) are regarded as input signals 104 from the viewpoint of the vehicle management and control system 100. These input signals are fed to the vehicle management and control system 100 via its main computer 200's USB ports.

Output signals 106 connection—Output signals 106 are signals generated by the vehicle management and control system 100 to instruct a specific vehicle system/subsystem to perform certain actions (e.g. run propulsion motor at a certain RPM, set transmission to DRIVE mode, activate left turn signal indicator, etc.). Output signals 106 are fed to individual vehicle systems and subsystems 102 via theirs own USB ports.

Feedback signals 108 connection—Feedback signals 108 are signals generated by individual vehicle systems and subsystems 102 after a performance or non-performance of an action as a result of instruction from the vehicle management and control system 100 (e.g. feedback signal generated by a sensor that monitors the RPM of the output shaft of an electric motor). All feedback signals 108 are encoded in USB protocol, and are fed back into the vehicle management and control system 100 to create a closed loop.

EXAMPLE

Managing Turn Signal Indicators

The detailed operation of the vehicle management and control system 100 (in particular the function of the master control framework 204) is best described using an example. The following illustrates how the vehicle management and control system 100 can be used to manage a vehicle's turn signal indicators.

The vehicle systems/subsystems involved in this example are:

The Steering System
The Lighting System (The reason why the steering system is involved in the management of the vehicle's turn signal indicators is because a turn signal needs to be cancelled after the steering wheel has been turned in that direction).

The steering wheel has a lock-to-lock rotation of 900° (2.5 turns). A potentiometer is mounted in-line with the steering column so that when the steering wheel is turn, the potentiometer is also turned. Thus the potentiometer can be used to generate an analog signal (i.e. an input type signal 104) that, through a simple USB encoder circuit, generate a range of value (e.g. from −1.0 to 1.0) that will indicate the rotation of the steering wheel. This input information 314 is then fed to the vehicle management and control system 100 (specifically through polling method, by a subcontroller class within the master control framework 204).

The lighting system has a turn signal stalk that allows a driver to turn on the left or right signal indicator lamp. Like in most cars, the turn signal stalk has three positions, and each position has two states:

left signal on (true/false)
right signal on (true/false)
at neutral position (true/false)

Thus the turn signal stalk will generate digital signals (i.e. input type signals 104) that, through a simple USB encoder circuit, give a boolean value to indicate the stalk position as set by the driver. Similarly, this input information 314 is fed to the vehicle management and control system 100 (specifically through polling method, by a subcontroller class within the master control framework 204).

Therefore when the driver flicks the turn signal stalk to activate the left signal (as an example), the following takes place:

i. The encoded input information generated by the turn signal stalk is read by a subcontroller class (which is one of the many subcontroller classes 308 dedicated to continually polling the vehicle's controls). This information is then made available to the Main Controller class through the subcontroller class's getter methods.

ii. Similarly, the encoded input information generated by the steering wheel is also read by another subcontroller class. This information is similarly made available to the Main Controller class through the subcontroller class's getter methods.

iii. The Main Controller class then writes the values of the input information (of both turn signal stalk and steering wheel) to the Main Model class 304 through the Main Model class 304's setter methods. This input information is then made available to a submodel class dedicated to logic processing for the vehicle's lighting system (This submodel class is one of the many submodel classes 310).

iv. Based on supplier set algorithm, the submodel class generates an output information instructing the left turn signal lamp on the vehicle to blink. A feedback signal is also generated and sent to the vehicle management and control system 100.

v. Another subcontroller class reads the feedback information, and makes it available to the Main Controller class 302, which in turn writes the feedback value to the Main Model class 304.

vi. This feedback value is picked up by a subview class responsible for displaying the turn signal indicators on the digital instrument cluster. Thus a blinking arrow graphic is displayed on the digital instrument cluster informing the driver that the left signal lamp on the vehicle is now activated. The information flow loop is now complete.

vii. Steps ii to vi are repeated until the driver has turned the steering wheel at least 45° (value modifiable in Component Data file) in the direction of the turn signal and then turns it in the opposite direction—all this logic processing is worked out by the submodel class responsible for the logic processing of the lighting system. Once that condition is reached, the submodel class will send an output signal instructing the turn signal lamp to be cancelled.

viii. Consequently, the turn signal lamp sends a feedback signal to the vehicle management and control system to tell it that the turn signal lamp is now off, and this is subsequently updated on the digital instrument cluster.

DESCRIPTION

Alternative Embodiments

The vehicle management and control system can also employ mobile operating system (e.g. Google Android®, Apple iOS®, Microsoft Windows Phone®, etc.) as its operating system 202. A computer such as ones used in information appliances (e.g. tablet computers) can also be used as the main computer 200 provided that performance and durability requirements can be satisfied.

Moreover, the master control framework 204 (of the vehicle management and control system 100) can be developed in other programming languages such as C++, Objective-C, and even web based languages such as HTML5/CSS3+JavaScript, etc.

Regarding the classes within the master control framework 204, they may also be coded in such a way that event based strategy (such as used in an observer pattern) is used in place of continuous polling of input information 314 and/or feedback information 316, provided that these events are generated by the classes within the master control framework 204 and their origins can be easily traced.

Advantages

From the description above, a number of advantages of some embodiments of my vehicle management and control system become evident:

Reduced Complexity

All or majority of a vehicle's systems and subsystems' logic processing can be delegated to one main computer (i.e. the vehicle management and control system). Consequently individual vehicle systems and subsystems are reduced to performing simpler input/output tasks as instructed by the vehicle management and control system. This has the potential to eliminate the need for complex embedded systems in individual systems and subsystems, or at least greatly reduce the number of embedded systems and their responsibilities. A system/subsystem without an embedded system is also easier to develop and cheaper to manufacture.

The use of a single main computer and single operating system for vehicle logic processing further eliminate inter-system conflicts, thereby simplifying the integration process. Virtual testing can also be done much easier and much earlier in the vehicle development cycle to determine how well all systems and subsystems models (i.e. logic) function together as a whole.

Moreover, since the vehicle management and control system's master control framework updates all vehicle systems and subsystems in a systematic and predefined order, unexpected interrupts can be eliminated or drastically reduced. Software bugs can also be traced much more easily since all logic processing is contained within one framework and not spread across multiple embedded systems and programs.

The simplification of integration and testing will allow for vehicle development cost to be dramatically reduced and time-to-market shortened.

Increased Compatibility Between the Auto Industry and General Computer Industry

The main computer would employ hardware, software and communications protocols that are compatible with the general computer industry. Consequently, its advancement can be synchronised to the advancement of the general computer industry; it can utilise the latest hardware, software and communications protocols available in the general computer industry. This also has the potential to encourage cross-pollination of ideas, manpower and materials (both hardware and software) between the auto industry and the computer industry with little modifications and retraining (in the case of manpower). There will also be no need to keep up with the myriad and often non-standardised protocols currently used in the auto industry. Third party electronic devices (e.g. smart phones) will also be easier to integrate than ever before without producing unintended results.

The use of a platform that is compatible with the general computer industry will also reduce the cost of product development (i.e. vehicle systems and/or subsystems) by suppliers since the expertise required to develop such products are more widely available, the standards are more consistent and accessible, and development tools could be obtained for free in the form of open-source software.

Increased Flexibility

The vehicle management and control system, through its Component Data file and Vehicle Data file, allow many system and subsystem properties and thus behaviours to be modifiable by vehicle manufacturers, suppliers and/or approved technicians by simply using an ordinary text editor without the need to modify the master control frameworks source code. This built-in flexibility allows the same framework to be used across different range of vehicles that share common systems and/or subsystems; customizing certain behaviours of a system/subsystem is then as easy as editing its properties.

Moreover, master control framework updates (whether to fix a bug, add or improve certain algorithms) can also be delivered to vehicles via the Internet.

Where aesthetic personalization and customization is concerned, the digital instrument cluster that is part of the framework can also be easily skinned by end users.

CONCLUSION, RAMIFICATIONS, AND SCOPE

Accordingly the reader will see that, according to one embodiment, the multitudes of complex embedded systems currently used in existing vehicles may be eliminated, simplified or at least drastically reduced in number as their logic processing functions are delegated to the vehicle management and control system. This effectively reduces the complexity of the vehicle itself, which translates to cost and time savings for vehicle manufacturers, suppliers, end users and service technicians.

The use of standards and communications protocols compatible with the general computer industry in the vehicle management and control system further enhances the exchange of ideas and technology between the automotive and computer industries, thereby accelerating the growth and convergence of vehicles and computers in a sustainable way.

Additional time and cost savings for vehicle manufacturers can also be realised through the flexibility of the vehicle management and control system in that the same master control framework can be used across a range of vehicle models with little modifications.

Furthermore, the vehicle management and control system has many advantages in that:

- it allows the logic processing of various vehicle systems and subsystems to be delegated to one main computer instead of being spread across multiple embedded systems;
- it allows each vehicle system/subsystem to be made simpler in design and therefore increased in reliability as well as lower in production cost;
- it eliminates or greatly reduces inter-system conflicts in a vehicle;
- it allows earlier virtual testing (in development cycle) of an vehicle as a whole (i.e. all systems and subsystems integrated) as opposed to testing systems in isolation;
- it eliminates or drastically reduce unexpected interrupts from vehicle systems and subsystems;
- it enhances bug tracking and software debugging;
- it reduces the potential liability for vehicle manufacturers that may occur due to complex vehicle faults;
- it eliminates the problems due to non-standardisation of protocols faced by the auto industry;
- it permits third party consumer devices to be integrated much more easily and without undesirable conflicts with vehicle systems and subsystems;

it permits vehicle systems and subsystems to be developed at a lower cost using hardware and software tools borrowed from the general computer industry;

it allows easy modifications of the behaviours and functions of vehicle systems and subsystems through modifications of the properties used by their logic processing algorithms;

it allows greater scope of cooperation between vehicle manufacturers and suppliers in the development of vehicle systems and subsystems;

it allows the easy, aesthetic customization of the digital instrument cluster by end users;

it allows critical updates to the master control framework to be delivered online;

While the above description contains many specificities, these should not be construed as limitations on the scope of any embodiment, but as exemplifications of various embodiments thereof. Many other ramifications and variations are possible within the teachings of the various embodiments. For example, a tablet computer may be used as the vehicle management and control system's main computer as long as the resultant performance is satisfactory and the computer itself is compatible with the general computer industry; the vehicle management and control system's main computer may also be configured to run as a soft, real-time operating system if required; a different physical durability standards other than MIL-STD-810G and IP65 may also be used (for the main computer) as long as all safety, durability and legislative requirements are met; an alternative communication protocol other than USB may also be used as long as the protocol is supported by the general computer industry.

Thus the scope should be determined by the appended claims and their legal equivalents, and not by the examples given.

I claim:

1. A method of managing and controlling the operation of a vehicle, comprising:

connecting a single processor to a plurality of systems and subsystems of said vehicle with a universal serial bus communication protocol;

storing all communication data between said single processor and said plurality of systems and subsystems of said vehicle with a memory;

programming a memory controller in object-oriented programming language consisting of a main application class, a main controller class, a main model class and a main view class, wherein said memory controller initiates said main application class to declare said main controller class, said main model class and said main view class, wherein said memory controller receives input data and feedback data contained in said main controller class from said plurality of systems and subsystems of said vehicle, wherein said memory controller evaluates said input data and said feedback data contained in said main model class and makes logic decisions based on preprogrammed conditions, wherein said memory controller outputs said feedback data graphically, textually and/or audibly to a driver of said vehicle; and operating said single processor, said memory and said memory controller with a single operating system, wherein said single operating system, via said memory controller, controls a plurality of functions of said plurality of systems and subsystems of said vehicle by managing communication between said single processor and said plurality of systems and subsystems of said vehicle.

* * * * *